United States Patent
Matsumoto et al.

(10) Patent No.: US 7,543,050 B2
(45) Date of Patent: Jun. 2, 2009

(54) NETWORK TERMINAL WITH A PLURALITY OF INTERNAL WEB SERVERS

(75) Inventors: Hideto Matsumoto, Nagoya (JP); Naoki Otsuka, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 584 days.

(21) Appl. No.: 10/227,247

(22) Filed: Aug. 26, 2002

(65) Prior Publication Data

US 2003/0055888 A1    Mar. 20, 2003

(30) Foreign Application Priority Data

Aug. 27, 2001    (JP) ............................. 2001-256682

(51) Int. Cl.
*G06F 15/173* (2006.01)
(52) U.S. Cl. ...................................... 709/223; 709/224
(58) Field of Classification Search ................ 709/223, 709/203, 224; 358/1.14, 1.15
See application file for complete search history.

(56) References Cited

U.S. PATENT DOCUMENTS

| | | | |
|---|---|---|---|
| 5,701,451 A * | 12/1997 | Rogers et al. ................... 707/1 |
| 5,798,738 A * | 8/1998 | Yamada ....................... 345/2.3 |
| 5,956,487 A | 9/1999 | Venkatraman et al. |
| 6,006,266 A | 12/1999 | Murphy, Jr. et al. |
| 6,020,973 A | 2/2000 | Levine et al. |
| 6,170,007 B1 | 1/2001 | Venkatraman et al. |
| 6,345,291 B2 | 2/2002 | Murphy, Jr. et al. |
| 6,351,772 B1 | 2/2002 | Murphy, Jr. et al. |
| 6,477,567 B1 * | 11/2002 | Ohara ........................ 709/223 |
| 6,697,849 B1 * | 2/2004 | Carlson ...................... 709/219 |
| 6,763,479 B1 * | 7/2004 | Hebert ........................... 714/4 |
| 6,820,125 B1 * | 11/2004 | Dias et al. ................... 709/229 |

(Continued)

FOREIGN PATENT DOCUMENTS

EP    0 965 908 A2    12/1999

(Continued)

OTHER PUBLICATIONS

Ohara, Network System, Network Managing Method, Interface Device, Program Storage Device Readable by the Interface Device, and Terminal Device, Aug. 5, 1998, U.S. Appl. No. 09/129,537.*

(Continued)

*Primary Examiner*—Larry D Donaghue
*Assistant Examiner*—Brian J Gillis
(74) *Attorney, Agent, or Firm*—Oliff & Berridge, PLC.

(57) ABSTRACT

A multifunction peripheral includes a control portion, a LAN interface portion, and web servers. The web server manages information about components in the control portion, the user I/F portion, the printer, and the scanner. The web server manages information about components in the LAN interface portion. The web servers are configured for mutual transmission. The web server is connected to a LAN through a network control portion. When information that is managed by the web server is requested from a terminal that is connected to the LAN, then the web server functions as a proxy server to transfer the requested input from the LAN to the web server and to transmit information transferred from the web server to the requestor.

17 Claims, 9 Drawing Sheets

U.S. PATENT DOCUMENTS

| | | | |
|---|---|---|---|
| 6,829,059 B1* | 12/2004 | Kimura | 358/1.15 |
| 6,867,876 B1* | 3/2005 | Czyszczewski et al. | 358/1.15 |
| 6,944,654 B1* | 9/2005 | Murphy et al. | 709/223 |
| 6,947,182 B1* | 9/2005 | Kumagai | 358/402 |
| 2002/0188735 A1* | 12/2002 | Needham et al. | 709/229 |
| 2002/0198995 A1* | 12/2002 | Liu et al. | 709/226 |
| 2003/0084105 A1* | 5/2003 | Wiley et al. | 709/205 |

FOREIGN PATENT DOCUMENTS

| | | |
|---|---|---|
| EP | 1 017 225 A2 | 7/2000 |
| JP | A-6-243081 | 9/1994 |
| JP | A 11-53139 | 2/1999 |
| JP | A 2000-3301 | 1/2000 |
| JP | A-2000-194670 | 7/2000 |
| WO | WO A1 00/16201 | 3/2000 |

OTHER PUBLICATIONS

"Terminal-13 a searchNetworking definition", Nov. 27, 1999, Whatis.com archived on Internet Archive Wayback Machine, http://webarchive.org/20010728192545/http://searchnetworking.techtarget.com/sDefinition/0,,sid7_gci213122,00.html.*

U.S. Appl. No. 09/129,537, filed Aug. 5, 1998, Ohara.

* cited by examiner

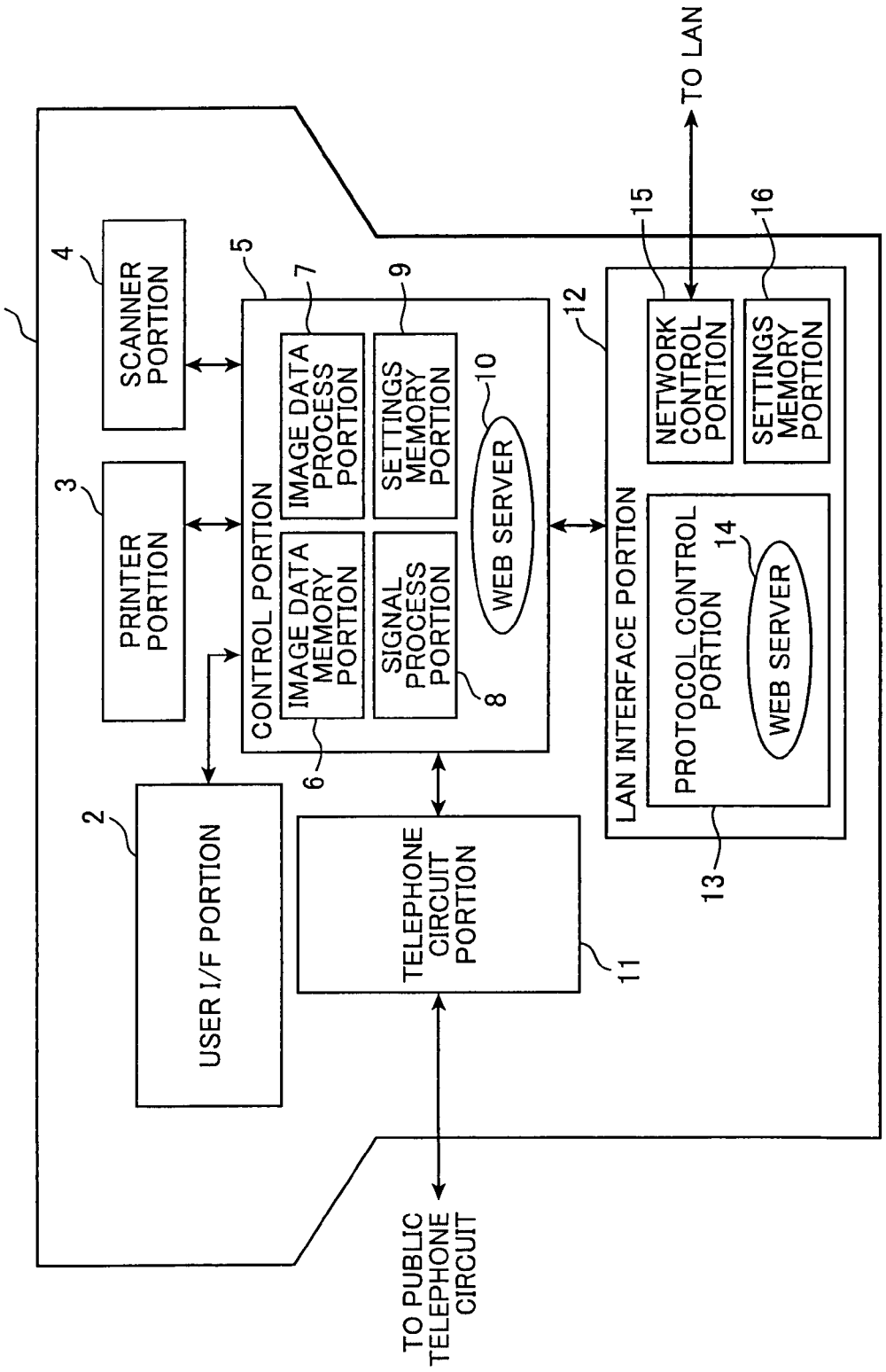

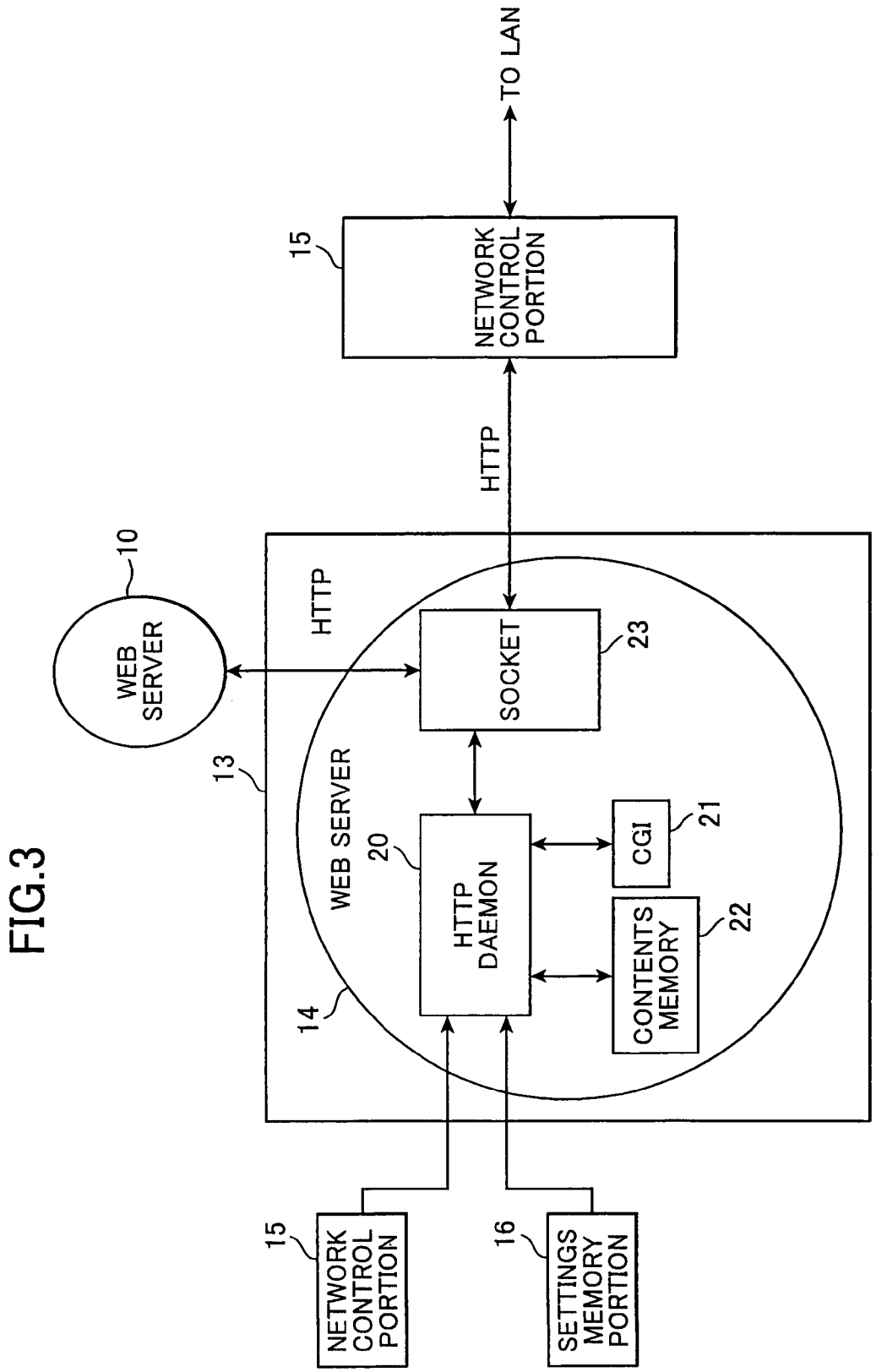

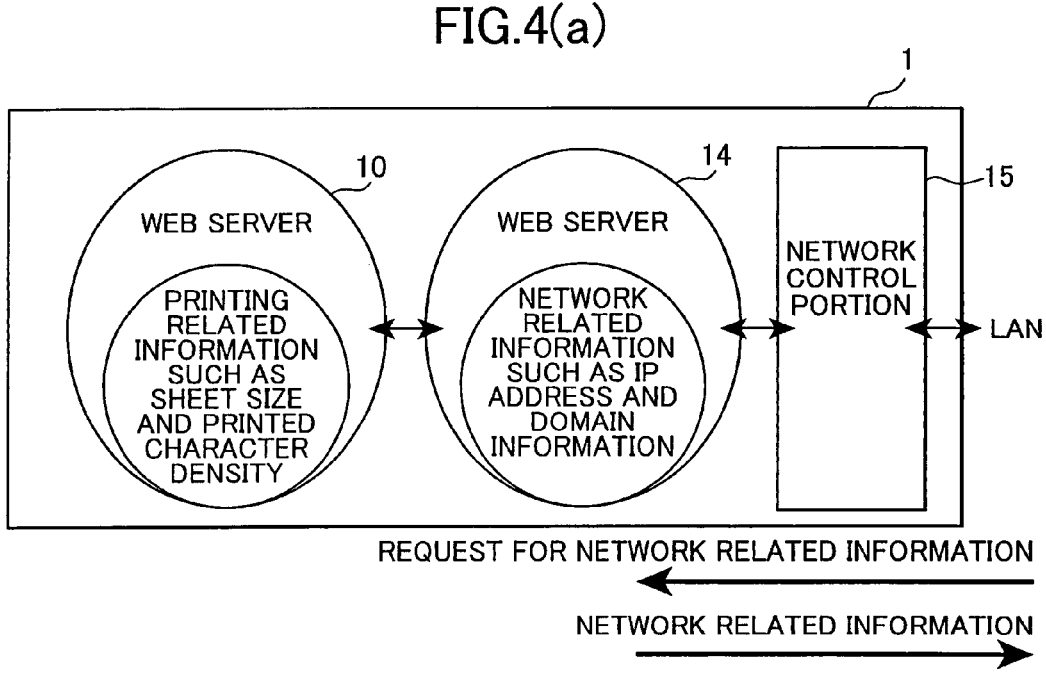
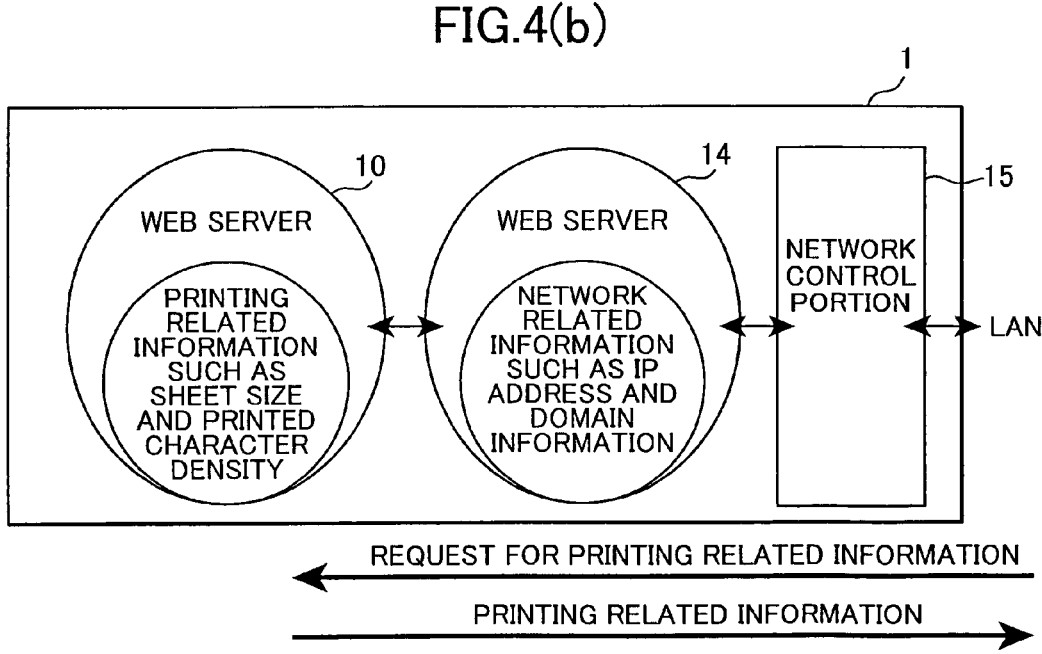

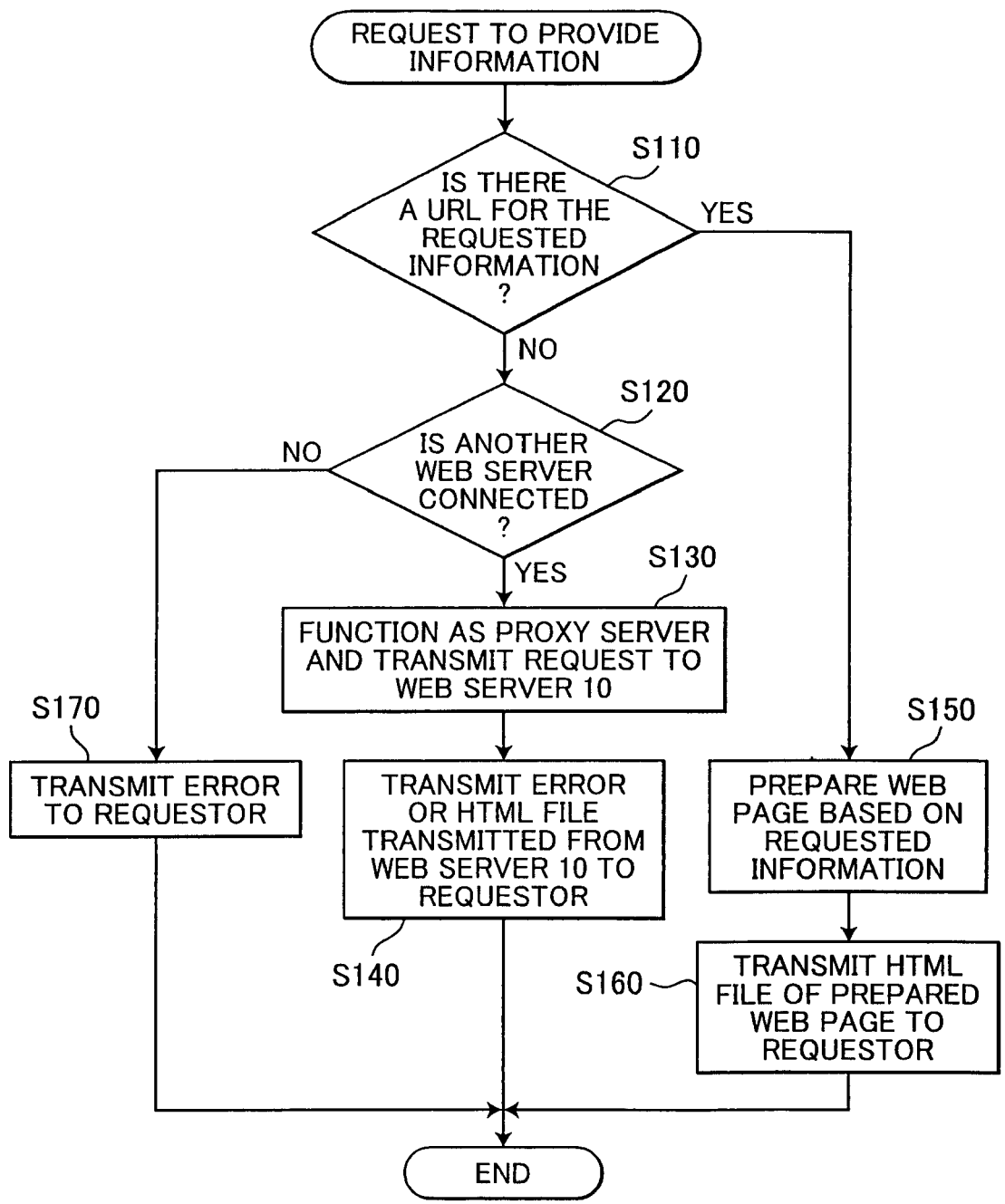

FIG.6

Configure TCP/IP

| | | |
|---|---|---|
| TCP/IP | ● Enable ○ Disable | |

Enabled Services
BRN_32013F_P1
BINARY_P1
TEXT_P1
POSTSCRIPT_P1
PCL_P1
BRN_32013F_P1_AT IP Address

- IP Address: 10.134.43.204
- Subnet Mask: 255.255.0.0
- Gateway: 10.134.254.254
- Boot Method: STATIC ▼
- Boot Tries: 3

RARP Boot Settings

☑ No Subnet Mask

☐ No Gateway

TCP Window    4096

TCP Timeout   60 min

LPD Settings  ☐ LPD Banner Enable

[ Cancel ] [ Submit ]

NETWORK TERMINAL WITH A PLURALITY OF INTERNAL WEB SERVERS

BACKGROUND OF THE INVENTION

1. Field of the Invention

The present invention relates to network terminal including a plurality of web servers that gather information about software or hardware resources of the network terminal in accordance with a request from another network terminal and provides the information to the requestor.

2. Description of the Related Art

Multifunction peripherals (MFP) are becoming popular on the market. A typical MFP is provided with a scanner function, a facsimile function, and a printer function so that a single device serves as a scanner, a facsimile, and a printer.

FIG. 1 is a functional block diagram of a conventional MFP. As shown in FIG. 1, the conventional MFP 50 includes a user interface portion (user I/F) 51, a printer portion 52, a scanner portion 53, a control portion 54, a telephone circuit portion 61, and a LAN interface portion 62. The user interface portion 51 includes a liquid crystal display, key switches, and the like. The liquid crystal display is provided for displaying the status of and methods of operating the MFP 50. The key switches are provided for inputting commands into the MFP 50. The printer portion 52 is provided for printing on print sheets stored in the MFP 50. The scanner portion 53 retrieves text, photographs and the like as image data. The control portion 54 governs the user interface portion 51, the printer portion 52, and the scanner portion 53. The telephone circuit portion 61 is provided for connecting the control portion 54 to the Internet or to an external facsimile machine that is connected to a public telephone line. The LAN interface portion 62 is connected to a local area network (LAN) to which the MFP 50 is connected.

The MFP 50 configured as described above uses a plurality of CPUs individually in different portions of the MFP 50 to control the MFP 50 in a divided manner, so that the overall processing performance of the MFP 50 is enhanced. Specifically, each of the control portion 54 and the LAN interface portion 62 includes a CPU, a RAM, a ROM, an I/O, and a serial interface (serial I/F). The user interface portion 51, the printer portion 52, and the scanner portion 53 are controlled by the CPU 55 of the control portion 54. Communication between the MFP 50 and the LAN is controlled by the CPU 63 of the LAN interface portion 62.

The CPU 55 of the control portion 54 executes programs for controlling each portion governed by the CPU 55 and also an information gathering program 56 for gathering information about the status of each portion. Also, the CPU 63 of the LAN interface portion 62 executes programs relating to transmission control and also a web server program 64. The web server program will be referred to as "web server" hereinafter. The web server 64 gathers information about the LAN interface portion 62, information about each portion governed by the CPU 55 of the control portion 54, and the like according to a request from a terminal connected to the LAN and provides the information to the requester. It should be noted that the information gathering program 56 is executed by the CPU 55 in response to a request from the web server 64, gathers information from each portion governed by the CPU 55, and transmits the information to the web server 64. With the web server 64, the MFP 50 can provide information about each portion of the MFP 50 to terminals connected to the MFP 50 through the LAN.

However, the following disadvantages have been noted with respect to the MFP 50 configured as described above.

First, when new operational functions, such as a video capture function for capturing video images from a video camera or video deck, are added to the MFP so with the above-described configuration, the information gathering program 56 and the web server 64 must be expanded so as to make it possible to provide information related to the added operational function across the LAN to the terminals connected to the MFP 50. More specifically, information about newly added operational functions must be added to the information gathering program 56 and the web server 64 as a new program function and the processes of the program must be rearranged to enable the newly added function to process. The more program functions are added, the greater is the labor required to add or rearrange the programs. Therefore, it has not been easy to expand operational functions.

Second, while the information gathering program 56 of the MFP 50 gathered information about each portion governed by the control portion 54, it was the web server 64 that converted the gathered information into a web page format and transmitted the converted information to the requester and that governed information about the entire MFP 50. For this reason, the processing burden on the web server 64 increases. If the web server 64 is expanded, then the CPU 63 will be troubled by processes of the web server 64 so there is a potential problem that execution of other programs will be influenced.

A newly functioning portion may be provided with a CPU. In such a case, to gather information about the newly functioning portion with an information gathering program executed by the CPU of the newly functioning portion, there is a need to add a transmission interface program to the web server in order to communicate with the information gathering program.

SUMMARY OF THE INVENTION

It is an object of the present invention to eliminate the above-described disadvantages and provide a network terminal that can easily add newly functioning portions without expanding the web server.

To achieve the above and other objects, there is provided according to one aspect of the invention a network terminal connected to a network, that includes a plurality of process portions, a plurality of hardware resources and software resources governed by the plurality of process portions, and a plurality of web servers connected to form a web server network. The plurality of web servers share the plurality of process portions and manage information available from shared process portions. Information managed by one of the plurality of web servers is transmitted to at least a predetermined web server in the web server network. The predetermined web server receives a request from a requestor connected to the network for information available from a particular process portion in the plurality of process portions and transmits requested information to the requestor.

In the network terminal with this configuration, the plurality of web servers mutually divide up and manage information about each process portion of the network terminal. When a request comes from a requester (that is also a network terminal), the predetermined web server gathers information from the web server that manages the requested information and provides the requested information to the requester.

That is, the network terminal according to the present invention can easily configure each web server for dividing up and managing the information about each process portion by the plurality of web servers.

Also, HTTP (HyperText Transfer Protocol) used in transmissions between the web server and the requester can be also used for transmission between web servers. Therefore, as long as a newly added process portion is provided with a web server, the network terminal can be easily expanded without providing a new transmission interface to an already existing web server.

In the network terminal of the present invention, at least the predetermined web server is connected to the network and the plurality of web servers are connected in series.

With the connection of the web servers as described above, transmission of the request from the requester to the relevant web server that manages the requested information and also transmission of the requested information from the relevant web server to the requester is simple so that management of transmission pathways is simple.

The web server network may include at least three web servers that are mutually connected to each other. In this mutual connection, management of transmission pathways becomes complicated. However, requests from the requester to the relevant web server can be transmitted and requested information from the relevant web server can be transmitted to the predetermined web server by selecting suitable transmission pathways bypassing excess web servers. That is, because transmission between web servers can be performed without waste, troublesome routing processes of requests and information for excessive web servers that can hinder other processes can be prevented.

It is preferable that each of the plurality of web servers stores not only items of information subject to manage but also items of information that rest of the plurality of web servers manage.

When the web server is configured in this manner, each web server can easily perform settings of waste-free transmission pathways in order to be able to mutually grasp information managed by the web server. Also, when the requested information is not available, the web server that received the request from the requester directly notifies the requester about this fact without passing through other web servers.

It is further preferable that each of the plurality of web servers advises the rest of the plurality of web servers of added or removed items of information when an increase or a decrease in number of items of information subject to manage is detected.

By configuring the web server in this manner, when hardware resources are added to or removed from the network terminal, all web servers can grasp the added or removed items. That is, because each web server is constantly able to grasp the newest condition of items managed by the other web servers, meaningless searches for removed items can be prevented.

In the network terminal described above, the particular web server provides, to the requestor, at least one of information about operation status of a designated process portion in the plurality of the process portions and information that the requester is allowed to change operation conditions of the designated process portion.

In this case, the operation status of the process portion of the network terminal, such as enabled status of TCP/IP, can be grasped by the requester and manipulation or adjustment of the designated process portion can be performed by changing the operation conditions at the side of requester. Specifically, information about the operation conditions changed based on the information provided to the requester is sent back to the designated process portion, so that the operation conditions of the designated process portion are changed.

BRIEF DESCRIPTION OF THE DRAWINGS

The above and other objects, features and advantages of the invention will become more apparent from reading the following description of the embodiment taken in connection with the accompanying drawings in which:

FIG. 2 is a block diagram of an MFP according to a first embodiment of the invention;

FIG. 3 is a block diagram of a web server provided in the MFP of the first embodiment of the invention;

FIG. 4(a) is an explanatory diagram showing requests from a LAN and information provided from a web server to a requester;

FIG. 4(b) is an explanatory diagram showing another requests from the LAN and information provided from the web server to the requester;

FIG. 5 is a flowchart showing flow of processes in a web server provided in the MFP according to the first embodiment of the invention;

FIG. 6 is a schematic view of a web page provided from the MFP of the first embodiment of the invention;

DETAILED DESCRIPTION OF THE PREFERRED EMBODIMENTS

A first embodiment of the present invention will be described with reference to FIGS. 2 through 6.

Figure 1:
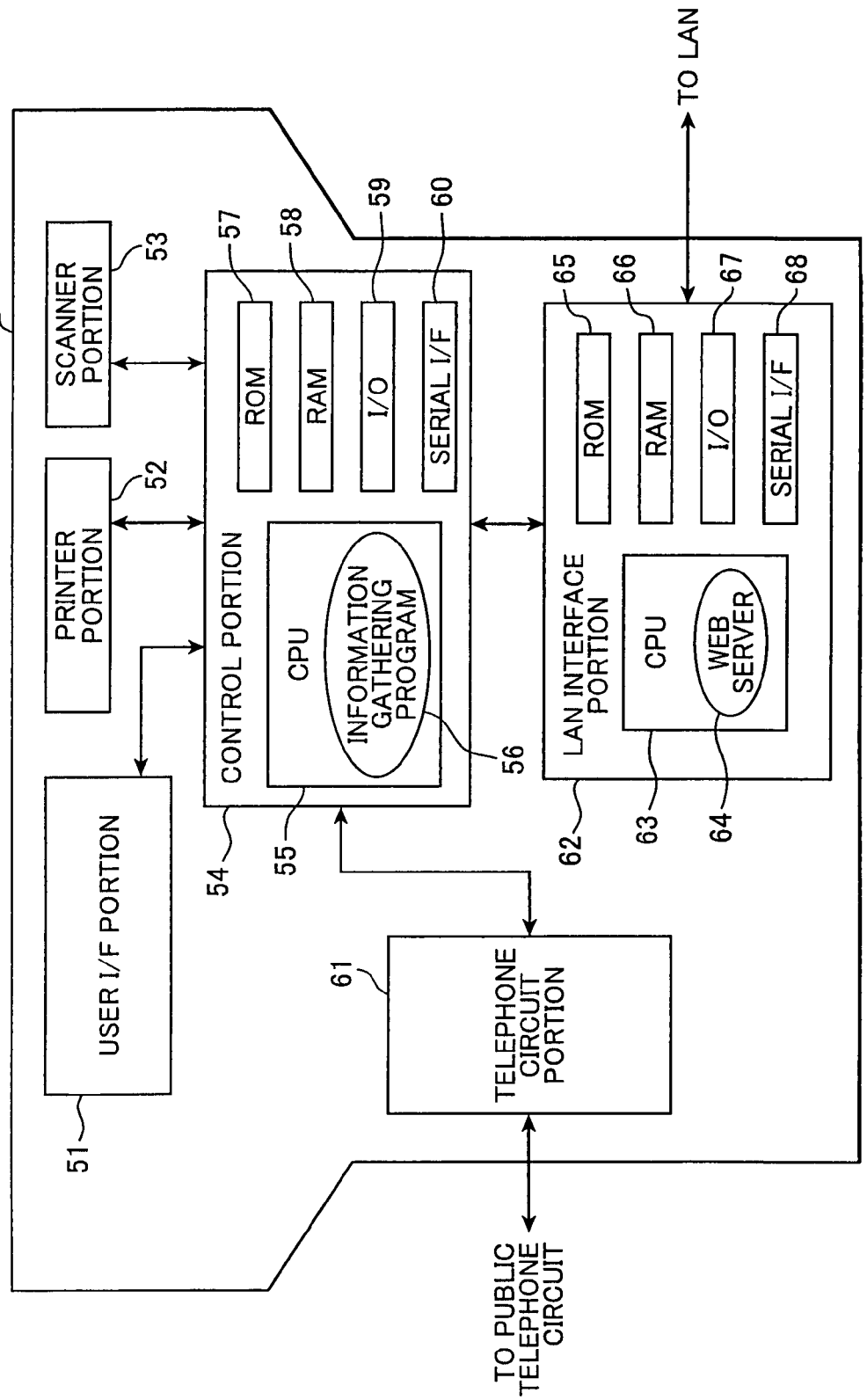
FIG. 1 is a block diagram of a conventional MFP.

FIG. 2 is a block diagram of an MPF to be connected to a LAN as one of network terminals. As shown in FIG. 2, an MFP 1 according to the first embodiment includes a user I/F portion 2, a printer portion 3, a scanner portion 4, a control portion 5, a telephone circuit portion 11, and a LAN interface portion 12. It should be noted that the user I/F portion 2, the printer portion 3, the scanner portion 4, and the telephone circuit portion 11 are exactly the same as the user I/F 51, printer portion 52, scanner portion 53, and telephone circuit portion 61, respectively, as shown in FIG. 1, so their description will be omitted and detailed description will be provided only for the control portion 5 and the LAN interface portion 12.

The control portion 5 includes an image data memory portion 6, an image data process portion 7, a signal process portion 8, a settings memory portion 9, and a web server 10. The image data memory portion 6 stores image data output from the scanner portion 4. The image data process portion 7 processes the image data. The signal process portion 8 processes signals received from the LAN or the user I/F portion 2 and sends commands to the components of the control portion 5 or to the components governed by the control portion 5. The settings memory portion 9 stores settings set by the control portion 5. The web server 10 gathers information on each of the components governed by the control portion 5 in accordance with a request received over the LAN and sends the information to the requester.

The LAN interface portion 12 includes a protocol control portion 13, a network control portion 15, a settings memory portion 16, and a web server 14. The protocol control portion 13 secures transmission between the MFP 1 and a terminal connected to the LAN (hereinafter referred to as a "LAN terminal") at application layer level, the transport layer level, and the network layer level of TCP/IP protocol. The network control portion 15 secures communication between the MFP 1 and the LAN terminal at the link layer level of TCP/IP protocol. The settings memory portion 16 stores settings set to the LAN interface portion 12. The web server 14 is provided within the protocol control portion 13. The web server 14 gathers information about each component in the LAN interface portion 12 in accordance with a request received over the LAN and sends the information to the requester.

It should be noted that the control portion 5 and the LAN interface portion 12 are configured from well-known circuitry, such as a CPV, RAM, ROM, I/O, and a serial interface. Each of the components in the control portion 5 and the LAN interface portion 12 is realized by a program.

The internal configuration of the web server 14 provided in the LAN interface portion 12 will be described with reference to FIG. 3.

As shown in FIG. 3, the web server 14 includes an HTTP daemon 20 (hereinafter referred to as "daemon"), a CGI (Common Gateway Interface) 21, a contents memory portion 22, and a socket 23. The daemon 20 functions as a server, which transmits information about the protocol control portion 13, the network control portion 15, and the settings memory portion 16 managed by the LAN interface portion 12 to the requester in web page format, and also as a proxy server, which transfers requests from the LAN to the web server 10 and transmits information from the web server 10 to the requestor. The CGI 21 is started up by the daemon 20, gathers information from the protocol control portion 13, the network control portion 15, and the settings memory portion 16, prepares a web page including the information thus gathered, and supplies an HTML (Hyper Text Markup Language) file corresponding to the web page to the daemon 20. The contents memory portion 22 stores items of information managed by the web server 14, design of the web page used when preparing the web page, and the like. The socket 23 is connected to the daemon 20, the web server 10 of the control portion 5, and the network control portion 15. The socket 23 enables HTTP to be used as the transmission protocol during transmission between the daemon 20 and the web server 10 and between the daemon 20 and the LAN. The socket 23 enables the daemon 20 to transmit only in HTTP without trouble regardless of whether the receiving party is the web server or the LAN.

It should be noted that the web server 10 provided in the control portion 5 has exactly the same configuration as the web server 14 except that the web server 10 differs from the web server 14 in two points: the web server 10 is connected only to the web server 14 and the web server 10 is configured to gather information from components within the control portion 5 and peripheral components that are governed by the control portion 5. Accordingly, no further description of the web server 10 is necessary.

FIG. 5 is a flowchart representing flow of processes performed at the web server 14 when the web server 14 is requested over the LAN to provide particular information. It should be noted that the web server 10 as well as the web server 14 perform similar processes.

As shown in FIG. 5, when the a request to provide information is received from a LAN terminal, then the daemon 20 of the web server 14 confirms whether the URL for the requested information exists in the contents memory portion 22 (S110). If the target URL is in the contents memory portion 22, then the daemon 20 retrieves the corresponding information from the contents memory portion 22 and prepares an HTML file (web page). When the web page is being prepared, the CGI 21 is started up as the case demands. The CGI 21 gathers information in the LAN interface portion 12 and prepares the web page based on the information thus gathered (S150). When the HTML file of the web page is provided from the CGI 21, then the HTML file is transmitted to the requester via the socket 23 (S160).

However, if a URL for the requested information does not exist in the contents memory portion 22 (S110: NO), then it is confirmed whether another web server is connected to the web server 14 (S120). If it is confirmed that another web server, that is, web server 10 in this example, is connected to the web server 14 (S120: YES), then the daemon 20 functions as a proxy server and transfers the request from the LAN terminal to the web server 10 via the socket 23 (S130).

If there is a URL in the contents memory portion of the web server 10 for the requested information, then the daemon 20 transmits the HTML file transferred from the web server 10 to the requestor (S140). When there is no URL of the requested information in the contents memory of the web server 10, then an error message indicting that the requested information is not found is sent from the web server 10 to the daemon 20. In this case, the daemon 20 transmits to the requestor the error message transmitted from the web server 10.

In S120, when it cannot be confirmed that that another web server is connected to the web server 14 (S120: NO), then the daemon 20 transmits to the requestor an error that the MFP 1 does not store the requested information (S170).

By following these steps, the web server provided in the MFP 1 transmits to the requester information complying with a request inputted over the LAN.

FIGS. 4(a) and 4(b) are explanatory diagrams showing flow of processes between the web servers. To facilitate description, it will be assumed that the web server 10 manages printing related information, such as density of printed characters and size of sheets housed in the MFP 1 and the web server 14 manages network related information, such as domain information of the administrator that manages the MFP 1 and the IP address of the MFP 1.

As shown in FIG. 4(a), when a request for network related information is made over the LAN, then first the web server 14 receives the request. Then, because the web server 14 is the server that manages information relating to the network, the web server 14 gathers requested information from each component that the web server 14 manages and transmits the information thus gathered to the requester.

On the other hand, as shown in FIG. 4(b), when a request for printing related information is made to the MFP 1, the web server 14 does not manage the printing related information so the web server 14 operates as a proxy server and transfers the request from the LAN to the web server 10 connected to the web server 14. When the web server 10 receives the request, the web server 10 gathers the requested information from components managed by the web server 10 and transfers the information thus gathered to the web server 14. The web server 14 operating as a proxy server transmits the information received from the web server 10 to the requester.

FIG. 6 shows one of the web pages produced by the web server 14. As shown in FIG. 6, web page 30 is to be provided to a requester of information relating to TCP/IP and includes information about settings, such as TCP/IP and IP address of the LAN interface portion 12. The web page 30 is supported by a GUI (Graphical User Interface) so the web page 30 does not only provide settings information about the LAN interface portion 12 but also allows the user to easily change and manipulate settings. For example, a TCP/IP setting portion 31 for setting whether to enable use of TCP/IP transmission protocol displays a circular frame to the left of each setting category. When the user clicks on the circular frame to the left of a setting category, then a black dot will be displayed in the center of the circular frame and the setting category will be changed. Also, an IP address display portion 32 for displaying information on the IP address and the like includes five square frames indicating parameters of information categories such as subnet mask and IP address. The IP address and the like of the MFP 1 can be changed by merely inputting new parameters in the frames. The user of the MFP 1 views the web page 30 configured in this manner using browser software provided in the LAN terminal. After the settings newly set by the above-described operations, various setting information in the web page 30 is transmitted to the web server 14 by merely clicking on a submit button 33 to transmit to the LAN interface portion 12. The various setting information transmitted to the web server 14 is transferred from the daemon 20 of the web server 14 to the various components in the LAN interface portion 12. Therefore, each component that receives setting information changes settings according to the setting information. That is, the requestor can easily manipulate settings of the MFP 1 by the web server provided in the MFP 1 without the requester obtaining information from each component of the MFP 1.

The MFP 1 of the first embodiment with the above configuration is provided with a plurality of web servers. The web servers divide management of information for various components of the MFP 1. Therefore, each web server can be simply configured. Also, exchange of information between CPUs can be secured by merely using HTTP, which is the transmission protocol of the web server and external network, via the socket provided in the web server. That is, there is not need to provide each CPU with a special communication interface program as is the case in the conventional MFP. Further, if a new hardware provided with the CPU is added to the MFP 1, as long as a web server is provided to the added CPU, information about the new hardware can be managed by the MFP 1 without expanding the management items of the web servers 10, 14.

Accordingly, the present embodiment can provide a network terminal that can easily have its functions expanded. When a new function is added to the MFP 1 of the present embodiment provided with two web servers, it is desirable that the web server provided for the newly added function be connected in series with the web server 10. When the web server network is configured by connecting the web servers in series to each other, management of the transmissions pathway can be facilitated, because only a single transmission pathway exists for transferring requests from the LAN terminal to the web server and for transferring information from the web server to the LAN terminal.

Next, a second embodiment of the invention will be described with reference to FIG. 7. The MFP of the second embodiment is configured by adding an external memory and a video capture function portion to the MFP of the first embodiment. Both the external memory and the video capture function portion are provided with a separate web server. The MFP of the second embodiment includes a web server network configured by mutually connecting together all web servers provided separately for the control portion, the LAN interface portion, the external memory, and the video capture function portion of the MFP. Each web server of the second embodiment differs greatly from the web server of the first embodiment in that the web servers of the second embodiment store, in their contents memory portion, the items of information managed by other web servers, and mutually grasp what information is managed by which web server. Accordingly, the following description will be focused on a web server network made from web servers connected to each other and description about other portions of the MFP will be omitted.

Figure 7:
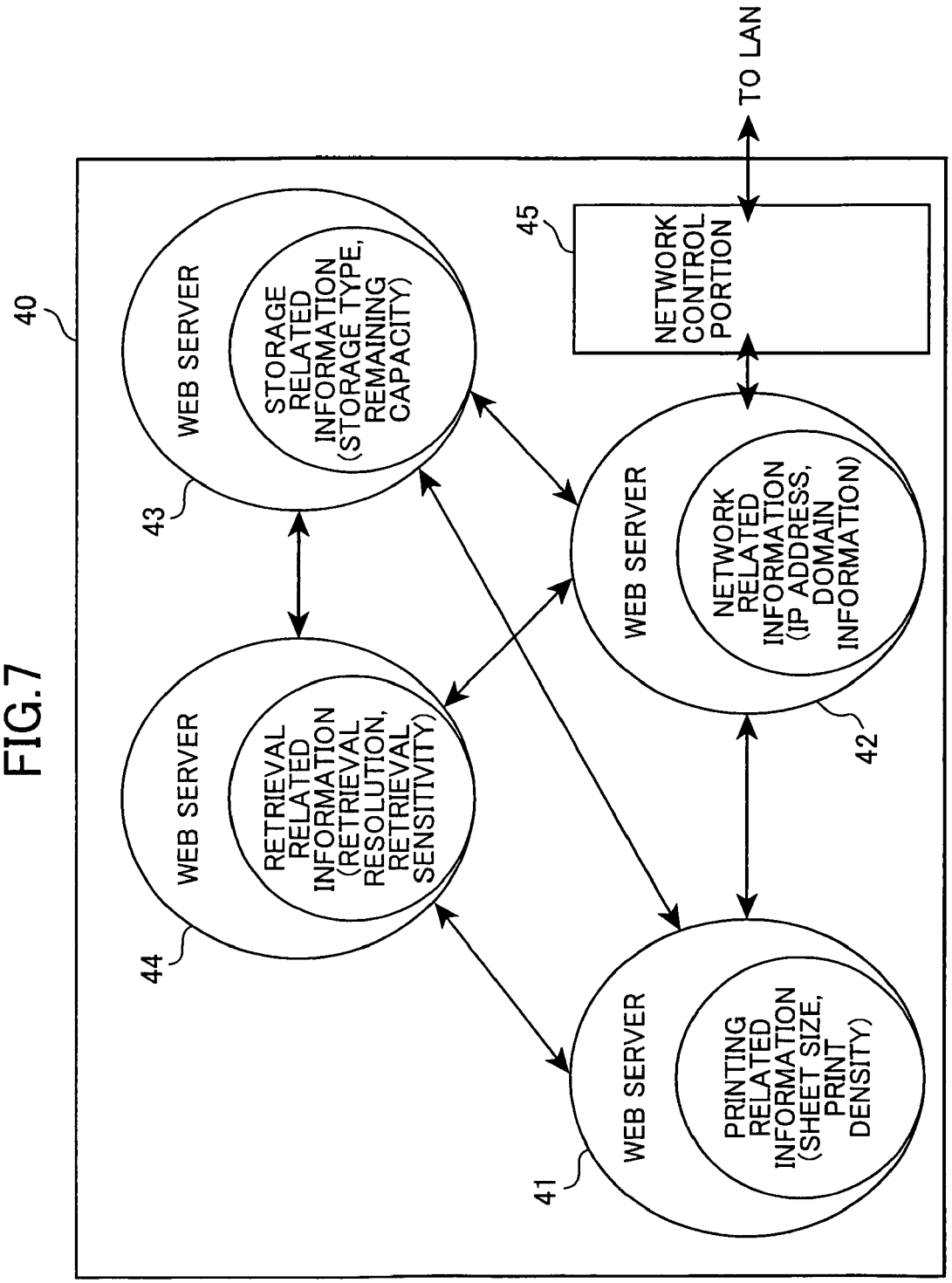
FIG. 7 is a schematic view of a web server network provided in an MFP according to a second embodiment of the invention.

As shown in FIG. 7, the web server network provided in the MFP 40 of the second embodiment includes web servers 41, 42, 43, and 44. The web server 41 gathers printing related information, such a print density and size of print sheets housed in the MFP 40 and provides it to the LAN terminal. The web server 42 gathers network related information, such as domain information of the administrator that manages the MFP 40 and the IP address of the MFP 40, and provides it to the LAN terminal. The web server 43 gathers storage related information, such as remaining amount of storage that indicates the remaining memory capacity of external memory device and storage type that indicates the type of the external memory connected to the MFP 40, and provides it to the LAN terminal. The web server 44 gathers retrieval related information, such as retrieval sensitivity and retrieval resolution of video images in the video capture function portion of the MFP 40.

Figure 8:
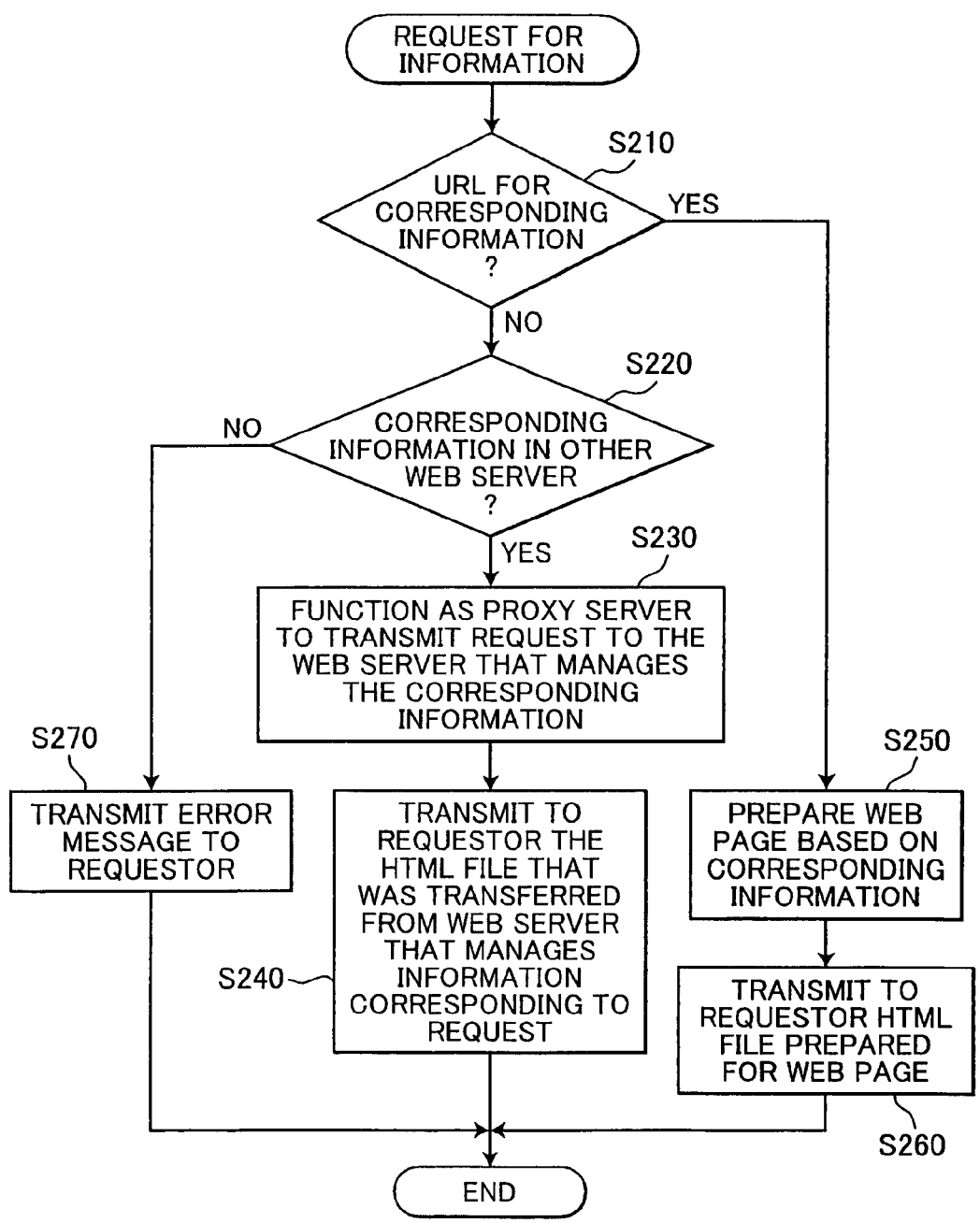
FIG. 8 is a flowchart showing flow of processes in a web server according to the second embodiment of the invention.

The web server 42 is connected to the LAN through a network control portion 45. The web server 42 first receives requests from the LAN terminal FIG. 8 is a flowchart representing flow of processes performed in the web server 42. The web servers other than the web server 42 are programmed to perform the same processes. As shown in FIG. 8, when there is a request for particular information from a LAN terminal, then the daemon of the web server 42 confirms whether the requested URL information exists in the contents memory portion of the web server 42 (S210). If the corresponding URL exists in the contents memory portion (S210: YES), then the daemon of the web server 42 retrieves the corresponding information from the contents memory portion of the web server 42 and prepares a web page. When the web page is prepared, the CGI of the web server 42 is started up if needed. The CGI gathers information in the LAN interface portion of the MFP 40 and prepares a web page based on the information thus gathered (S250). When the HTML file of the web page is supplied from the CGI, then the HTML file is transmitted to the requester via the socket of the web server 42 (S260).

However, if the URL for the requested information does not exist in the content memory portion of the web server 42 (S210: NO), then the daemon of the web server 42 confirms the management items in the contents memory portion for the other web servers to see if it is managed by the other web servers (S220). If it is confirmed that the information corresponding to the request is managed in another web server, then the daemon of the web server 42 functions as a proxy server to transfer the request from the LAN terminal through the socket of the web server 42 to the relevant web server that manages the information corresponding to the request. When the HTML file is transferred from the web server where the information corresponding to the request is managed, the daemon of the web server 42 transmits the HTML file to the requestor (S240).

When it is confirmed in S220 that the web servers other than the web server 42 do not manage information that corresponds to the request, then the daemon of the web server 42 transmits an error to the requester (S270). The error indicates that the corresponding information is not in the web server 42.

By following the above steps, the web servers provided in the MFP 40 transmit to a requester information as requested through the LAN. Also, by providing the web server network made from web servers that operate in this manner, even if the LAN terminal requests the MFP 40 of the present embodiment for information that is not managed at the MFP 40, the web server 42 that firstly receives the request can promptly notify the requester that the MFP 1 does not have the corresponding information. Also, because all of the web servers are mutually connected to each other, the web server 42 that firstly receives the request can merely serve as a proxy server to transmit the request from the LAN terminal to the relevant web server that manages the corresponding information and also can transmit the information from the relevant web server promptly to the requester. That is, because the request from the LAN terminal and the information from the relevant web server can be exchanged over the shortest transmission pathway, there is no need to operate a great many web servers more than needed as proxy servers, so that waste can be omitted.

The web servers in the MFP 40 of the second embodiment can be configured to detect an increase or decrease in the number of items that each server manages and to notify each other of the increased items or decreased items. More specifically, each section of the MFP 40 is configured to notify the daemon of the web server that is responsible for managing a change, when the change in the status of each portion is detected (for example, change of toner). The daemon that receives the notification judges which item has been added or removed and then requests the contents memory portion of the web server to add or remove the item and also notifies the other web servers about the added or removed item. The daemon of the other web server that receives the notification then adds or removes the item from the contents memory portion of the corresponding web server.

Figure 9:
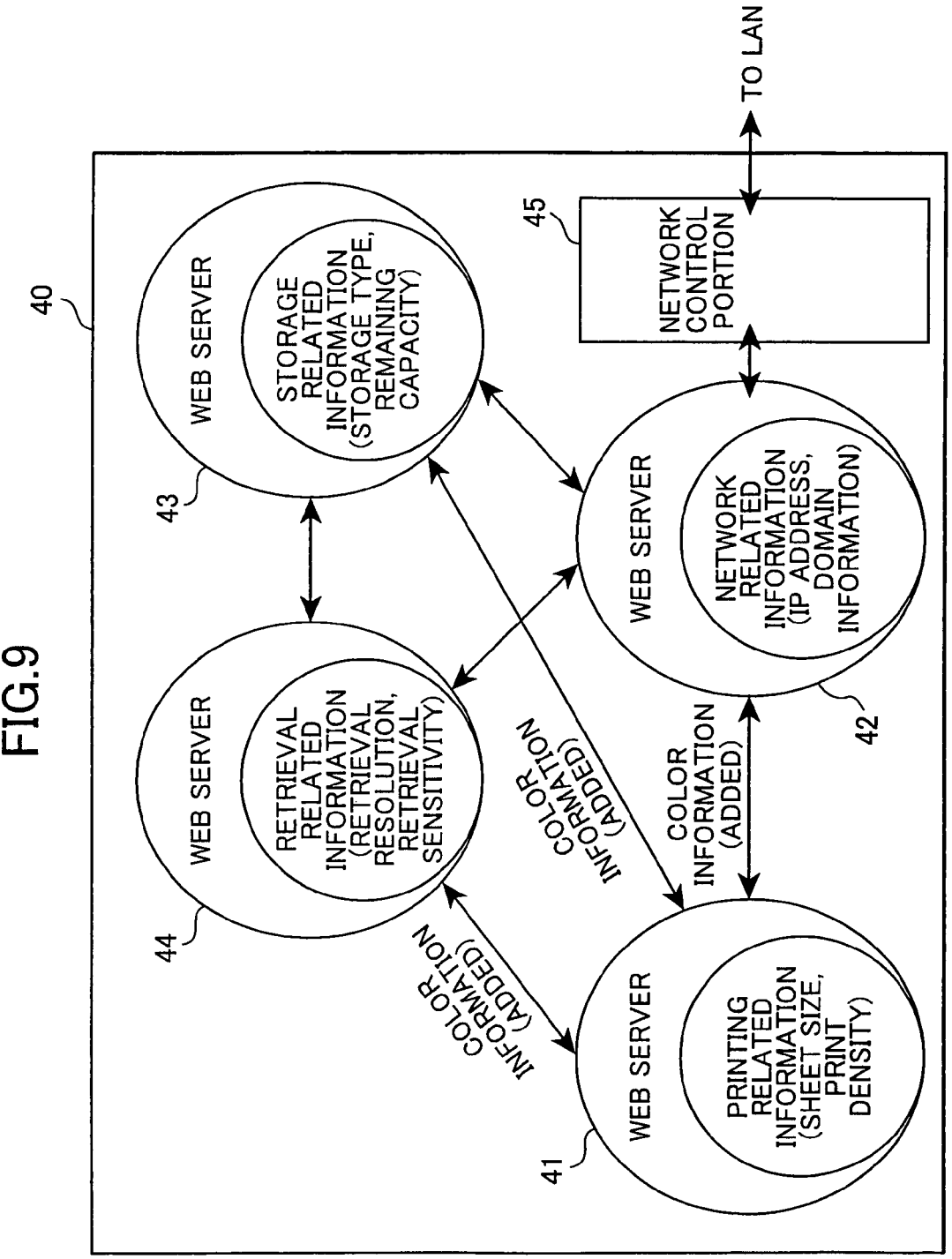
FIG. 9 is an explanatory diagram showing data communications performed between various portions of the MEP when a management item is added to the MFP of the second embodiment of the invention.

By configuring the web servers and the components of the MFP 40 in this way, when, as shown in the example of FIG. 9, color toner is added to the printer portion of an MFP 40 that has been set for monochrome printing, then the other web servers will be able to grasp that the item of color setting information and the like was added to the web server 41. Accordingly, each web server of the MFP 40 is able to constantly grasp the most recent valid items managed by other web servers. Therefore, the web server that first received the request from the LAN can be prevented from wastefully searching for information that corresponds to the request even though the item has already been removed.

Although the present invention has been described with respect to specific embodiments, it will be appreciated by one skilled in the art that a variety of changes and modifications may be made without departing from the scope of the invention. For example, although the present invention is applied to an MFP, the present invention is applicable to a device insofar as it includes an internal web server and is connected to a network.

In the embodiments, the MFP is only connected to a LAN. However, the MFP could also be connected to the Internet through a public telephone circuit. In this case, requests input from the Internet are first received by the web server in the control portion of the MFP.

Further, the MFP 1 of the first embodiment does not include configuration that is provided to the MFP 40 of the second embodiment. That is, the MFP 1 of the first embodiment does not include configuration for storing items of information managed by other web servers in the contents memory portion 22, and also configuration for notifying web servers of increases or decreases in the number of items managed by other web servers. However, the MFP 1 of the first embodiment can also be provided with such configurations. By adopting these configurations, the same effects can be achieved as in the MFP 40 of the second embodiment, wherein the web server 14 that first receives the request from the LAN can promptly notify the requester that no corresponding information is in the MFP 1.

The MFP 1 of the first embodiment was described with a plurality of web servers connected serially and the MFP 40 of the second embodiment was described with a plurality of web servers all mutually connected to each other. However, as needed a portion of the plural web servers can be connected serially and the rest of the web servers can all be connected mutually together. That is, two groups of web servers can be mixed together depending on the high or low frequently of transmissions. One group is web servers connected serially for the purpose of simplifying the transmission pathway and another group is web servers connected mutually together for the purpose of reducing the amount of wasteful transmissions.

What is claimed is:

1. A network terminal connected to a network, comprising:
a plurality of process portions;
a plurality of hardware resources and software resources governed by the plurality of process portions; and
a plurality of web servers connected to form a web server network within the network terminal,
wherein each of the plurality of the web servers takes charge of at least one of the plurality of process portions, manages information available from the at least one of the plurality of process portions, stores location information to identify a location of the information, produces a web page based on the information managed by each of the plurality of web servers, and transmits a file representing the web page to a predetermined web server in the web server network, the file containing the information,
wherein the predetermined web server comprises:
a first determining unit that determines, if the predetermined web server receives a request from a requestor connected to the network for information available from a particular process portion in the plurality of process portions, whether or not the predetermined web server stores location information to identify a location of the requested information by the requestor;
a first transmitting unit that produces, if the first determining unit determines that the predetermined web server stores the location information to identify the location of the requested information by the requestor, a web page containing the requested information identified by the location information and transmits a file representing the web page to the requestor; and
a transferring unit that transfers, if the first determining unit determines that the predetermined web server does not store the location information to identify the location of the requested information by the requestor, the received request to another web server, other than the predetermined web server, in the web server network,
wherein the another web server produces a web page containing the requested information to be transmitted in accordance with the request transferred from the predetermined web server and transmits a file representing the web page to the predetermined web server, and
wherein the predetermined web server transmits the file transmitted from the another web server to requestor.

2. The network terminal according to claim 1, wherein each of the plurality of web servers includes means for gathering information available from at least one of the plurality of process portions and producing the web page containing gathered information, the file representing the web page being transmitted to the requestor when the request from the requestor is received.

3. The network terminal according to claim 1, wherein the file is produced using hyper text markup language and transmitted to the requestor with HTTP.

4. The network terminal according to claim 1, wherein at least the predetermined web server is connected to the network and the plurality of web servers are connected in series.

5. The network terminal according to claim 1, wherein the web server network includes at least three web servers that are mutually connected to each other.

6. The network terminal according to claim 1, wherein at least the predetermined web server in the plurality of web servers stores items of information that rest of the plurality of web servers manage.

7. The network terminal according to claim 6, wherein when the first determining unit determines that the predetermined web server does not store the location information to identify the location of the requested information by the requestor, the transferring unit identifies a target web server that manages the requested information based on the items of information that the rest of the plurality of web servers manage and transfers the request to the target web server.

8. The network terminal according to claim 6, wherein the each of the plurality of web servers advises the predetermined web server of added or removed items of information when an increase or a decrease in number of items of information subject to manage is detected.

9. The network terminal according to claim 6, wherein if the first determining unit determines that the predetermined web server does not store the location information, the first determining unit further determines based on the stored items of information whether or not the another web server that manages the requested information by the requester is available, and
    wherein the first transmitting unit transmits an error that the network terminal does not store the requested information, if the first determining unit determines that the another web server is not available,
    wherein the transferring unit transfers the received request to the another web server, if the first determining unit determines that the another web server is available.

10. The network terminal according to claim 6, wherein the another web server, to which the request is transferred by the predetermined web server, comprises:
    a second determining unit that determines whether or not the another web server stores location information to identify a location of the requested information by the requestor; and
    a second transmitting unit produces, if the second determining unit determines that the another web server stores the location information to identify the location of the requested information by the requester, a web page containing the requested information identified by the location information and transmits a file representing the web page to the predetermined web server; and transmits, if the second determining unit determines that the another web server does not store the location information to identify the location of the requested information by the requester, to the predetermined web server an error that the network terminal does not store the requested information, and
    wherein the predetermined web server transmits the file representing the web page and the error from the another web server to the requestor.

11. The network terminal according to claim 1, wherein the particular web server provides, to the requestor, information about operation status of a designated process portion in the plurality of the process portions and information that the requestor is allowed to change operation conditions of the designated process portion.

12. The network terminal according to claim 11, wherein information about the operation conditions changed based on the information provided to the requestor is sent back to the designated process portion, so that the operation conditions of the designated process portion are changed.

13. The network terminal according to claim 1, wherein the network terminal is a multifunction peripheral.

14. The network terminal according to claim 1, wherein if the first determining unit determines that the predetermined web server does not store the location information, the first determining unit further determines that whether or not the predetermined web server is connected to the another web server in communication with each other, and
    wherein if the first determining unit determines that the predetermined web server is connected to the another web server, the transferring unit transfers the received request to the another web server; and if the first determining unit determines that the predetermined web server is not connected to the another web server, the first transmitting unit transmits to the requestor an error that the network terminal does not store the requested information.

15. The network terminal according to claim 1, wherein the another web server, to which the request is transferred by the predetermined web server, comprises:
    a second determining unit that determines whether or not the another web server stores location information to identify a location of the requested information by the requestor; and
    a second transmitting unit produces, if the second determining unit determines that the another web server stores the location information to identify the location of the requested information by the requestor, a web page containing the requested information identified by the location information and transmits a file representing the web page to the predetermined web server; and transmits, if the second determining unit determines that the another web server does not store the location information to identify the location of the requested information by the requestor, to the predetermined web server an error that the network terminal does not store the requested information,
    wherein the predetermined web server transmits the file representing the web page and the error from the another web server to the requester.

16. The network terminal according to claim 1, further comprising a printing portion and a network interface as process portions,
    wherein one of the plurality of web server manages information for the network interface and one of rest of the plurality of web servers manages information for the printing portion.

17. The network terminal according to claim 1, wherein a transmission protocol used for communication between the predetermined web server and the another web server is the same protocol used for communication between the predetermined web server and the requestor.

* * * * *